(12) United States Patent
Riley (10) Patent No.: US 8,163,116 B2
(45) Date of Patent: Apr. 24, 2012

(54) JOINTS AND A SYSTEM AND METHOD OF FORMING THE JOINTS

(75) Inventor: Jon Riley, Farmington, MI (US)

(73) Assignee: Zephyros, Inc., Romeo, MI (US)

( * ) Notice: Subject to any disclaimer, the term of this patent is extended or adjusted under 35 U.S.C. 154(b) by 700 days.

(21) Appl. No.: 11/742,025

(22) Filed: Apr. 30, 2007

(65) Prior Publication Data

US 2007/0281523 A1    Dec. 6, 2007

Related U.S. Application Data

(60) Provisional application No. 60/746,810, filed on May 9, 2006.

(51) Int. Cl.
    *B29C 65/48*    (2006.01)
    *B29C 44/12*    (2006.01)
    *B62D 21/00*    (2006.01)

(52) U.S. Cl. .......................... 156/79; 156/294; 296/205

(58) Field of Classification Search ................... 156/79, 156/91, 293, 294; 296/203.01, 205
    See application file for complete search history.

(56) References Cited

U.S. PATENT DOCUMENTS

| | | | |
|---|---|---|---|
| 5,266,133 A | 11/1993 | Hanley et al. | |
| 5,458,393 A * | 10/1995 | Benedyk | 296/203.01 |
| 5,575,526 A | 11/1996 | Wycech | |
| 5,686,509 A * | 11/1997 | Nakayama et al. | 523/201 |
| 5,755,486 A | 5/1998 | Wycech | |
| 5,766,719 A | 6/1998 | Rimkus | |
| 5,932,680 A | 8/1999 | Heider | |
| 6,068,424 A | 5/2000 | Wycech | |
| 6,131,897 A | 10/2000 | Barz et al. | |
| 6,332,731 B1 * | 12/2001 | Wycech | 403/171 |
| 6,422,575 B1 | 7/2002 | Czaplicki | |
| 6,467,834 B1 | 10/2002 | Barz | |
| 6,482,486 B1 | 11/2002 | Czaplicki | |
| 6,523,857 B1 | 2/2003 | Hopton | |
| 2002/0164201 A1 | 11/2002 | Lempfer | |
| 2002/0176737 A1 | 11/2002 | Reineke | |
| 2003/0196753 A1 * | 10/2003 | Schoenfeld et al. | 156/330 |
| 2004/0124553 A1 * | 7/2004 | Czaplicki et al. | 264/46.4 |
| 2005/0175400 A1 | 8/2005 | Behr | |
| 2006/0059807 A1 * | 3/2006 | Zimmerman et al. | 52/239 |
| 2006/0128494 A1 * | 6/2006 | Kumamoto | 473/316 |
| 2007/0134058 A1 | 6/2007 | Meyer | |
| 2008/0029200 A1 | 2/2008 | Sheasley | |
| 2008/0101856 A1 | 5/2008 | Clawson | |
| 2008/0295334 A1 | 12/2008 | Kulesha | |
| 2009/0142130 A1 | 6/2009 | Frisch | |
| 2009/0202294 A1 | 8/2009 | Apfel | |

FOREIGN PATENT DOCUMENTS

WO     00/27920 A1    5/2000

OTHER PUBLICATIONS

Co-Pending Application, U.S. Appl. No. 60/746,810, filed May 9, 2006, provisional application expired.

\* cited by examiner

*Primary Examiner* — Michael Tolin
(74) *Attorney, Agent, or Firm* — Dorbusin & Thennisch PC (57) ABSTRACT

Joints are formed for articles of manufacture such as transportation vehicles (e.g., automotive vehicles). The joints typically include a connector that is adhered to a first member and a second member with a structural adhesive, which may be a foam.

18 Claims, 4 Drawing Sheets

JOINTS AND A SYSTEM AND METHOD OF FORMING THE JOINTS

CLAIM OF PRIORITY

This application claims the benefit of the filing date of U.S. Provisional Application No. 60/746,810 filed May 9, 2006.

FIELD OF THE INVENTION

The present invention relates generally to the formation of joints of articles of manufacture such as a transportation vehicle and, more particularly, the present invention relates to the formation of joints interconnecting at least one tubular frame member of an automotive vehicle with at least one other member of the vehicle.

BACKGROUND OF THE INVENTION

Recent trends in manufacturing of articles of manufacture and particularly manufacturing of transportation vehicles (e.g., automotive vehicles) has given rise to the need for new and innovative joints that can be used in the formation of those articles. As one example, it has become increasingly desirable to form structural or other members (e.g., pillars, frame members and the like) of articles of manufacture (e.g., automotive vehicles) using forming techniques such as hydroforming, roll forming or the like, which can be less expensive, faster and/or can allow for the use of more desirable materials. While these techniques can effectively form members and particularly tubular structures having desired shapes, contours and/or configurations, these techniques can be limited in their ability to form joints that join these members to other members formed by the same or different techniques.

As another example, it has become increasingly desirable to use new assembly techniques for assembling structural or other members (e.g., pillars, frame members and the like) of articles of manufacture (e.g., automotive vehicles) together. In certain instances, however, these assembly techniques can create larger part tolerances, which need to be accommodated by the joints that join these members to other members.

As such, the present invention provides a joint and a system and method of forming the joint wherein the joint, the system and/or the method address one or more the aforementioned issues or other issues arising out of the new manufacturing trends.

SUMMARY OF THE INVENTION

The present invention is directed to a joint and method of forming the joint. According to the method, a first member and second member each having a distal end are provided. The first member, the second member or both can be provided by hydroforming a tubular structure defined by the respective member. A connector is also provided according to the method. The connector typically includes a base portion, a first portion extending away from the base portion and a second portion extending away from the base portion. The connector also typically includes an activatable material disposed upon the first portion and the second portion. The first portion and second portion are typically located adjacent the distal ends of the first member and second member. In embodiments where hydroformed tubes are employed, the first portion is typically located within the tunnel of the first tubular structure at the distal end of the first member and the second portion is typically located within the tunnel of the second tubular structure adjacent the distal end of the second member. The activatable material is typically activated to form a structural adhesive foam adhered to the first portion of the connector and the distal end of the first member and adhered to the second portion of the connector and the distal end of the second member. Again where tubular structures are employed, the activatable material can adhere to the interior surface of the first tubular and the interior surface of the second tubular structure. In one preferred embodiment, the first member is free of direct contact with the second member upon formation of the joint.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

The present invention provides a joint for an article of manufacture. The present invention also provides a system and method for the formation of the joint. It is contemplated, and in certain circumstances, for a single article of manufacture to include multiple (e.g., 2, 3, 4, 5, 6 or more) joints formed in accordance with the present invention. The joint of the present invention is particularly useful for automotive vehicles although it is contemplated that the joint may be applied to a variety of articles of manufacture such as airplanes, boats, buildings, furniture or the like.

A joint formed in accordance with the present invention will typically includes two or more of the following:
1) a first member having a distal end;
2) a second member having a distal end:
3) a connector having a first portion adjacent the distal end of the first member and a second portion adjacent the distal end of the second member; and
4) structural adhesive material adhering the distal end of the first member to the first portion of the connector and adhering the distal end of the second member to the second portion of the connector.

Generally, it is preferred that the first member is without direct contact with the second member, although such is not required unless specifically stated.

The connector of the present invention will typically include a base portion and one, two, three, four or more connective portions extending away from the base portion. It is generally preferable that the connector be a monolithic structure formed of a singular material although it is contemplated that the connector be formed of multiple pieces.

Figure 1A:
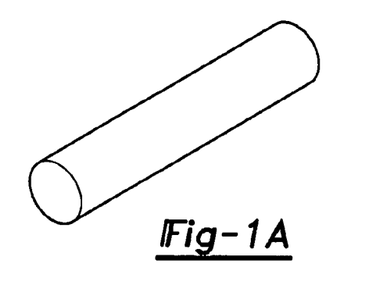
FIGS. 1A and 1B are perspective views of exemplary connectors formed in accordance with an aspect of the present invention.
Figure 1B:
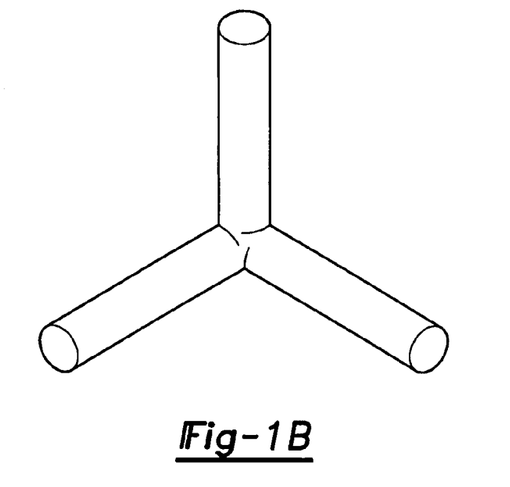
Figures 2A, 2B:
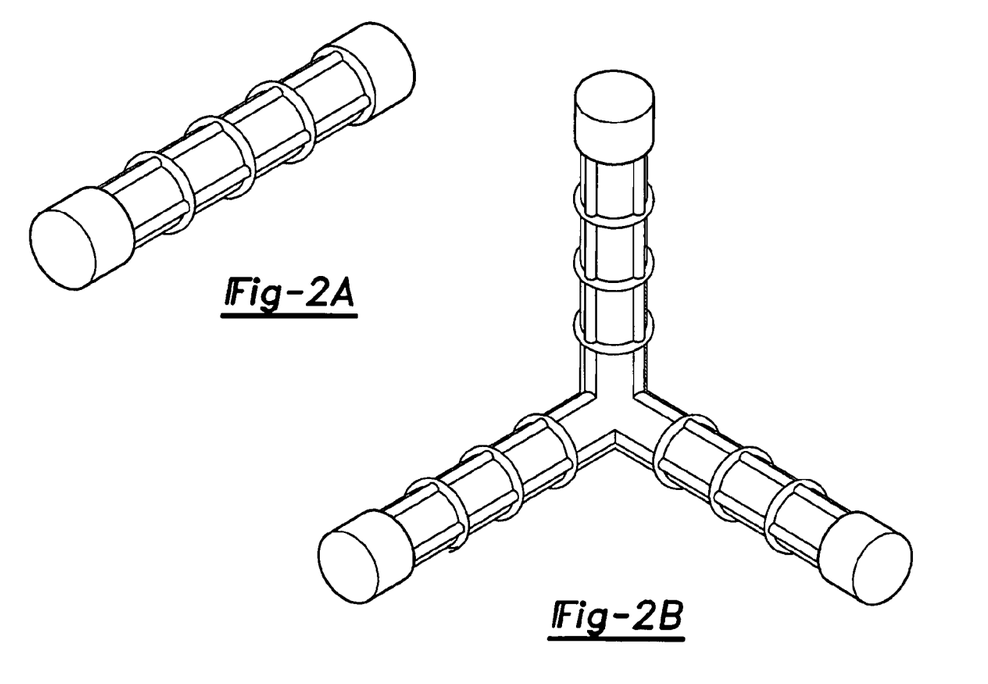
FIGS. 2A and 2B are perspective views of exemplary connectors formed in accordance with an aspect of the present invention.

In one embodiment, the connector is internally solid and continuous. Examples of such connectors are shown in FIGS. 1A and 1B. As an alternative, however, the connector can be skeletal in nature. A skeletal connector will typically include multiple ribs extending in one, two, three or more directions. In one preferred embodiment, the connector can include one or a plurality of first ribs that intersect one or a plurality of second ribs. Examples of such connectors are shown in FIGS. 2A and 2B.

The connector can be formed of a variety of materials and can be formed of a single material or multiple materials. As examples, the connector may be formed of polymeric materials, metals (e.g., aluminum, steel, magnesium, metal alloys) combinations thereof or the like. Exemplary, polymeric materials (e.g., thermoplastics, rubber, elastomer, thermosets or the like), include, without limitation, polyester, polypropylene, polyamide, molding compounds (e.g., sheet or bulk molding compound), polyethylene, polyvinylchloride, polyethylene, combinations thereof or the like. As will be recognized, the technique for forming and shaping the connector will typically depend upon the material of the connector. Examples of techniques include, without limitation, molding, stamping, hydroforming or the like. Thus, the connector could be a metal stamping, a metal casting (e.g., a metal, aluminum, aluminum foam, magnesium or magnesium foam casting), a thixomolded structure. The connector could also be a molded (e.g., injection, compression or blow molded) plastic structure.

A joint according to the present invention can connect two members, three members, four members or more. Moreover, the members can have a variety of configurations. Typically, each member of the invention has a distal end adjacent a portion of the connector and the member is elongated and extends outwardly away from the connector. The members will typically be formed of a metal material, however, it is also contemplated that the member can be formed of polymeric materials such as plastics (e.g., thermoset or thermpoplastic material) or composite laminates. Exemplary metal materials include, without limitation, steel, titanium, aluminum, iron, metal alloys, combinations thereof or the like.

The present invention is generally desirable for joining hollow members together. As used herein a hollow member is one that includes or defines an opening. The present invention is particularly desirable for joining tubular members. As used herein, a tubular member is one that defines and substantially or entirely surrounds an opening and more particularly a tunnel. For automotive applications, the tubular members or other shaped members can be hydroformed tubes, press formed tubes, roll formed tubes, stampings, thixomolds, extrusions (e.g., aluminum extrusions), castings, molded members (e.g., injection, compression or blow molded). Thus, the present invention contemplates method of forming joints that include prior or simultaneous forming and/or shaping of the members using one or any combination of the following techniques: hydroforming, casting, roll forming, stamping, thixomolding, injection molding, compression molding or blow molding.

The adhesive material may be an expandable or foamable material that is activated to expand and then cure to form a strong bond between adjacent surfaces (e.g. attachment surfaces). When expandable, the adhesion material preferably undergoes a volumetric expansion of no greater than 500%, more preferably no greater than 100% and even more preferably no greater than 50% over its original non-expanded volume. Of course, higher expansion levels are also contemplated within the present invention. The adhesive material may also be a non-expandable material, which may or may not be heat activated.

In one embodiment, the adhesive material is formed of a high compressive strength heat activated reinforcement material having foamable characteristics. The material may be generally dry to the touch or tacky and can be placed upon surfaces of members in any form of desired pattern, placement, or thickness, but is preferably a substantially uniform thickness. One exemplary expandable material is L-5204 structural foam available through L&L Products, Inc. of Romeo, Mich. Preferably the strength (e.g., tensile strength) of the adhesive material is at least about 5 Mpa, more preferably at least about 12 Mpa and even more preferably at least about 2° Mpa, although the strength may be lower as well.

Though other heat activated materials are possible for the adhesive material, a preferred heat activated material is an expandable plastic, and preferably one that is foamable. A particularly preferred material is an epoxy-based structural foam. For example, without limitation, the structural foam may be an epoxy-based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules.

A number of epoxy-based structural foams are known in the art and may also be used to produce the structural foam adhesive material. A typical structural foam includes a polymeric base material, such as an epoxy resin or ethylene-based polymer which, when compounded with appropriate ingredients (typically a blowing and curing agent), expands and cures in a reliable and predicable manner upon the application of heat or the occurrence of a particular ambient condition. From a chemical standpoint for a thermally-activated material, the structural foam is usually initially processed as a flowable thermoplastic material before curing. It will cross-link upon curing, which makes the material incapable of further flow. An example of a preferred structural foam formulation for the adhesive material is an epoxy-based material that is commercially available from L&L Products of Romeo, Mich., under the designations L5206, L5207, L5208, L5209, L-5220, L-7102, L-7220, XP321 and XP721 or others.

In one embodiment of the present invention, the adhesive material can include an impact modifier such as at least one shell/core impact modifier. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or same core/shell systems. Examples of such materials are include in commonly owned U.S. patent application Ser. No. 60/828,704, filed Oct. 9, 2006, which is incorporated herein by reference for all purposes.

One advantage of the preferred adhesive materials over prior art materials is that the preferred materials can be processed in several ways. The preferred materials can be processed by injection molding, extrusion compression molding or with a mini-applicator. This enables the formation and creation of part designs that exceed the capability of most prior art materials. In one preferred embodiment, the structural foam (in its uncured state) generally is dry or relatively free of tack to the touch. Moreover, the adhesive materials may be applied to the attachment surfaces of the members and/or connectors before or after assembly of those components together.

While the preferred materials for fabricating the adhesive material have been disclosed, the materials can be formed of other materials as well. Such material can be heat-activated or otherwise activated by an ambient condition (e.g. moisture, pressure, time or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. See also, U.S. Pat. Nos. 5,766,719; 5,755,486; 5,575,526; and 5,932,680, (incorporated by reference). In general, the desired characteristics of the structural foam include relatively high stiffness, high strength, high glass transition temperature (typically greater than 70 degrees Celsius), and good corrosion resistance properties. In this manner, the material does not generally interfere with the materials systems employed by automobile manufacturers.

In applications where the adhesive material is a heat activated, thermally expanding material, an important consideration involved with the selection and formulation of the material is the temperature at which a material reaction, expansion, activation, flow and possibly curing, will take place. For instance, in most applications, it is undesirable for the material to be reactive at room temperature or otherwise at the ambient temperature in a production line environment. More typically, the material becomes reactive at higher processing temperatures, such as those encountered in an automobile assembly plant, when the material is processed along with the automobile components at elevated temperatures or at higher applied energy levels, e.g., during painting preparation steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. If needed, blowing agent activators can be incorporated into the composition to cause expansion at different temperatures outside the above ranges.

Generally, suitable materials have a range of expansion ranging from approximately 0 to over 1000 percent. The level of expansion of the materials may be increased to as high as 1500 percent or more. Typically, strength is obtained from products that possess low expansion.

Some other possible materials for use as the adhesive material include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266, 133; 5,766,719; 5,755,486; 5,575,526; 5,932,680; and WO 00/27920 (PCT/US 99/24795) (all of which are expressly incorporated by reference).

In another embodiment, the material may be provided in an encapsulated or partially encapsulated form, which may comprise a pellet, which includes an expandable foamable material, encapsulated or partially encapsulated in an adhesive shell. An example of one such system is disclosed in commonly owned, co-pending U.S. application Ser. No. 09/524, 298 ("Expandable Pre-Formed Plug"), hereby incorporated by reference.

In addition, as discussed previously, preformed patterns may also be employed such as those made by extruding a sheet (having a flat or contoured surface) and then die cutting it according to a predetermined configuration in accordance with the chosen structure, panel or beam, and applying it thereto.

The skilled artisan will appreciate that the joints may be employed in combination with or as a component of a conventional sound blocking baffle, or a vehicle structural reinforcement system, such as is disclosed in commonly owned co-pending U.S. application Ser. Nos. 09/524,961 or 09/502, 686 (hereby incorporated by reference).

Adhesive materials according to the present invention may also exhibit a number of desirable properties. The adhesive materials according to the present invention can exhibit relatively high strength moduli while also exhibiting a high degree of ductility. The adhesive material, particularly for certain combinations and amounts of ingredients (e.g., combination of certain amounts of adduct, amounts of impact modifier or both) as disclosed herein, can exhibit various desirable properties. These properties are clearly displayed using a conventional double lap shear test method. Such method is described in ASTM Method D3528-96, Type A configuration, using the following test parameters: test adherends are 0.060 inch thick, 1 inch×4 inch EG-60 metal pre-cleaned with acetone; each adhesive bond line is 3 mm; test overlap dimension is 1 inch×0.5 inch; test rate is 0.5 inch/minute. Such test method can be used to derive desirable properties such as the following: the ratio of the strain-to-break divided by the strain-at-peak stress, which is referred to herein as the ductility ratio; the energy-to-break, which is calculated as the area under the stress-strain curve using the strain at break as the terminal value for the area calculation.

As one example, certain adhesive materials of the present invention have exhibited a post-activation ductility ratio that is greater than about 2.0, more typically greater than about 2.5 and even possibly greater than about 2.8. As another example, certain adhesive materials of the present invention have exhibited a post-activation energy-to-break value of greater than about 550 Nmm, more typically greater than about 700 Nmm and possibly greater than about 750 Nmm when determined in accordance with the aforementioned test method.

As yet another example, certain adhesive materials formed in accordance with the present invention have exhibited post-activation tensile modulus greater than about 15 MPa, more typically greater than about 200 MPa and even possibly greater than about 350 MPa when determined in accordance with ASTM D638 Type IV test method. Moreover, the adhesive material, particularly when provided as a solid, is typically less susceptible to breakage (e.g., chipping or the like).

Figures 3, 4, 5, 6:
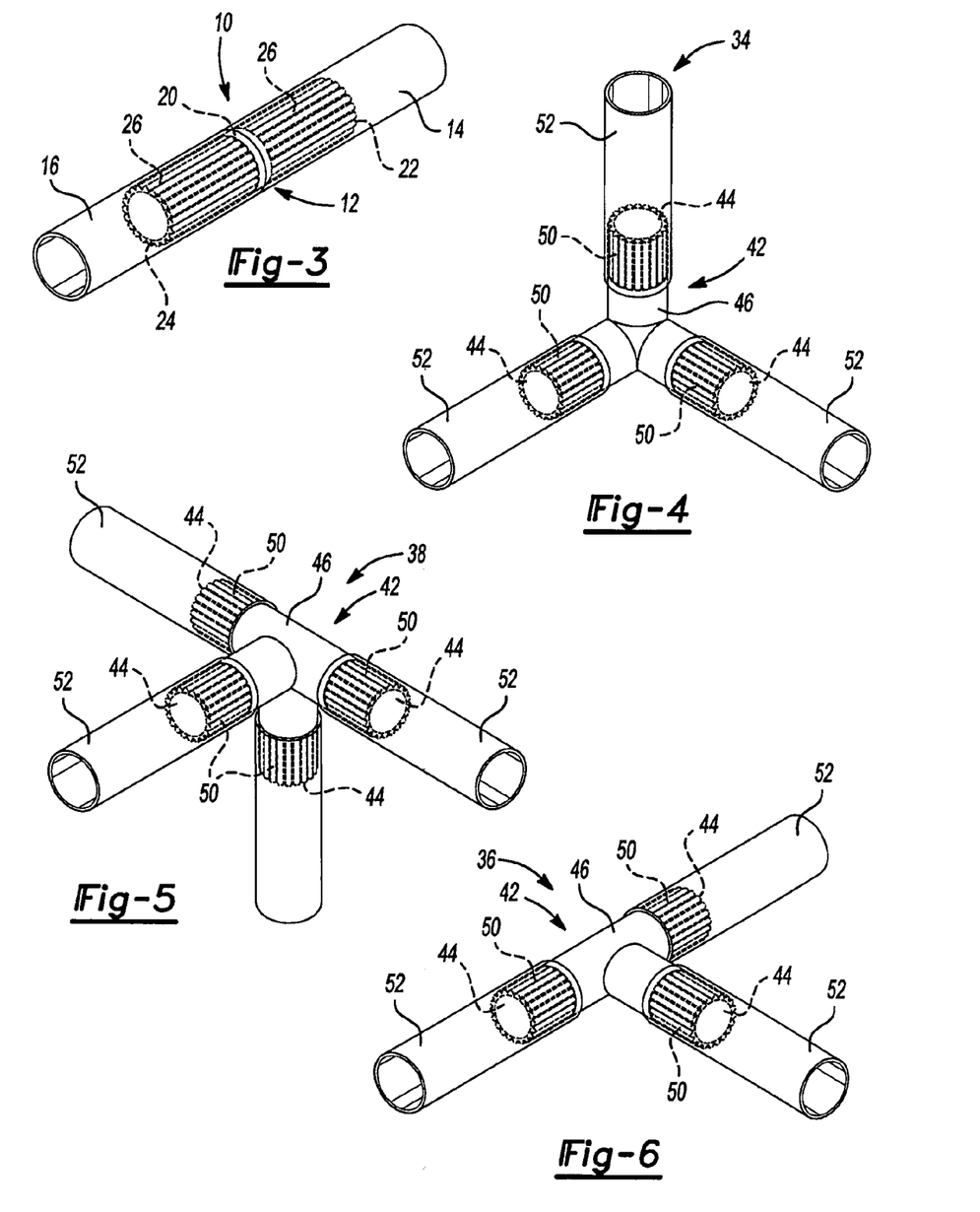
FIG. 3 is a perspective view of an exemplary joint formed in accordance with an aspect of the present invention.
FIG. 4 is a perspective view of an exemplary joint formed in accordance with an aspect of the present invention.
FIG. 5 is a perspective view of an exemplary joint formed in accordance with an aspect of the present invention.
FIG. 6 is a perspective view of an exemplary joint formed in accordance with an aspect of the present invention.

FIG. 3 shows one exemplary joint 10 formed in accordance with the present invention. As can be seen, the joint 10 is comprised of a connector 12 that interconnects a first member 14 to a second member 16. The connector 12 is illustrated as a generally cylindrical member and the first and second members 14, 16 are both tubular members.

In the embodiment depicted, the connector 12 includes a base portion 20 intermediate a first portion 22 and a second portion 24. The first portion 22 and second portion 24 are shown extend away from the base portion 20 in opposite directions and respectively into openings (e.g., tunnels) defined by the tubular members 14, 16. Heat activatable adhesive material 26 is disposed upon the first portion 22 and the second portion 24 for, upon activation, bonding the connector 12 to the tubular members 14, 16. In one preferred embodiment, before or after activation, the adhesive material 26 will extend substantially or entirely continuously about portions 22, 24 such that, after activation, the adhesive material 26 can substantially inhibit or prevent entry or exit from the tubular members 14, 16 of sound or mass (e.g., air or other objects) past the adhesive material 26 and portions 22, 24.

FIGS. 4-6 illustrate exemplary joints 34, 36, 38 of the present invention as well. Each of the joints 34, 36, 38 includes a connector 42 having multiple connector portions 44 extending away from a base portion 46 and each of those portions 44 includes heat activatable adhesive material 50 for joining the connector 42 to members 52. Each of those portions 44 can also include one, multiple or all of the characteristics described in relation to the portions 22, 24 of FIG. 3.

The joint 34 of FIG. 4 is a three way axis joint with three portions 44 extending outwardly from a base portion 46 in three different directions, one, two or all three of which may be perpendicular, obtuse or acute relative to each other for joining three members 52. The joint 36 of FIG. 6 also includes three portions 44 extending away from a base portion 46 for joining three members 52. The portions 44, 46 illustrated form a "T" shape. The joint of FIG. 5 includes four portions 44 extending outwardly from a base portion 46 in four directions for joining four members 52. Thus, the connector of the present invention can have at least two, three, four or more portions extending outwardly from a base portion.

The portions of the connector can extend away from the base portion in different directions and each of those directions is typically at an angle relative to the other one, two, three, four or more directions. The angle or angles are typically less than about 180°, more typically less than about 170°, even more typically less than about 140°, and possibly less than about 1200 and are typically more than about 8° and even more typically greater than about 30°.

In each of FIGS. 3-6, the connectors of the illustrated joints can serve as substantially the only structural interconnection between the members that they join. The members that they join can be without substantial or without any direct contact with each other. Moreover, the members are connected to each other without any welds directly connecting the members to each other and can also be without any welds indirectly to each other (e.g., through an interconnection piece welded to two or more of the members). These characteristics can be particularly desirable for articles of manufacture such as automotive vehicles. It is also contemplated that the member that the connectors join may contact each other without any structural attachment at those locations of contact. The members joined by these connectors are thus typically separate and distinct from each other. Of course, unless otherwise specifically stated, the members may be connected to each other by, for instance, one or more additional distinct connecting members or one or more integral portions of the members.

As suggested above, joints of the present invention are particularly useful for automotive vehicles. The joints can be used to join members of dissimilar metals. As used herein, the use of the term metal can include materials that have non-metal materials as well as long as the amount of metal is at least 50%, 75%, 90% or substantially entirely pure metal. Thus one of the members of a joint can be formed of a first metal (e.g., aluminum) while a second of the members can be formed of a second metal that is different from and potentially incompatible with the first metal. As used herein, one example of incompatible metals includes metals wherein one of the metals would cause galvanic corrosion of another of the metals. Thus, in one embodiment, it is contemplated that a first member of the joint will be formed of a first metal having an electrical or electrode potential that is at least 0.25, more typically 0.4, even more typically 1.1 and even possibly 1.8 volts higher or lower than the electrical potential of a second metal of a second and/or third member of the joint. A table of potentials is included as page 12 of this application for assistance in determining potential relative to a hydrogen electrode and also shows potential metals possible for the members of the present invention.

The joints can also join members having greater tolerances in the size of the members particularly since the adhesive material can be expandable to accommodate such tolerances. It is also contemplated that joints of present invention can provide a vehicle with a stiffer frame structure or body in white (BIW) for improved vehicle NVH.

The joints of the present invention can be used to join numerous different members of an automotive vehicle. Examples of members, any of which may be joined to each other depending upon vehicle design, include without limitation, BIW member, rails, rockers, cross-vehicle members, pillars, roof rails, roof bows, headers, door beam paddles, mirror brackets, upper and lower front body hinge pillars.

Figure 7:
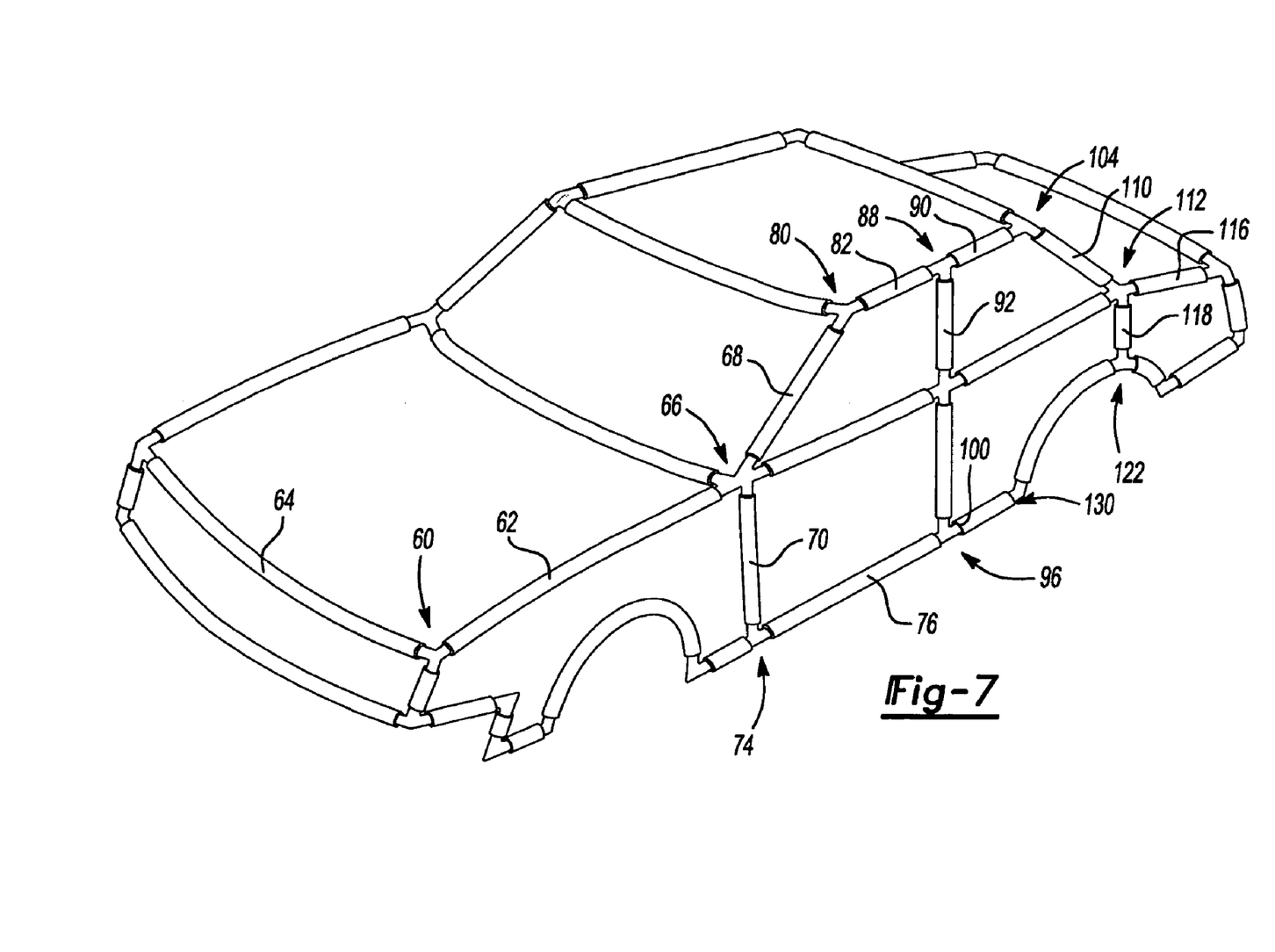
FIG. 7 is a perspective view of an exemplary automotive vehicle having multiple exemplary joints in accordance with an aspect of the present invention.

With reference to FIG. 7, several joints according to the present invention are illustrated and these joints can have any of the attributes discussed herein and particularly those attributes discussed in relation to the joint of FIGS. 3-6. Moreover, the members that can be joined according to the present invention, as illustrated by FIG. 7, are numerous. A joint 60 interconnects an upper forward rail 62 to a cross-vehicle beam 64. A joint 66 interconnects the upper forward rail 62 to an A-pillar 68 and a hinge pillar 70. A joint 74 interconnects the hinge pillar 70 to a lower frame rail 76. A joint 80 interconnects the A-pillar 68 to the roof rail 82. A joint 88 interconnects the roof rail 82 or potentially two members 90 that comprise the roof rail to a B-pillar 92. A joint 96 interconnects the frame rail 76 or potentially two members 100 that comprise the frame rail 76 to the B-pillar 92. A joint 104 interconnects the roof rail 82, 90 to a C-pillar 110. A joint 112 interconnects the C-pillar 110 to a rear upper rail 116 and/or to a rear pillar portion 118. A joint 122 interconnects any combination of the lower C-pillar, wheelhouse, floor, cross-members and upper C-pillar. Lastly, a joint 130 interconnects any combination of the lower frame rail 76, 100, one or more cross-members, the wheelhouse, floor and the lower C-pillar.

It is often desirable to provide the connector with attachments that at least temporarily attach the connector to the members to be joined prior to adhesion of the adhesive material. This is particularly the case when the adhesive material is configured to activate and bond to connectors and the members in a paint or e-coat processing or drying oven. For this purpose, a variety of attachments may be employed and can weld, adhere, interlock, compression fit, interference fit or otherwise attach the connector to the members to be joined.

Figure 8:
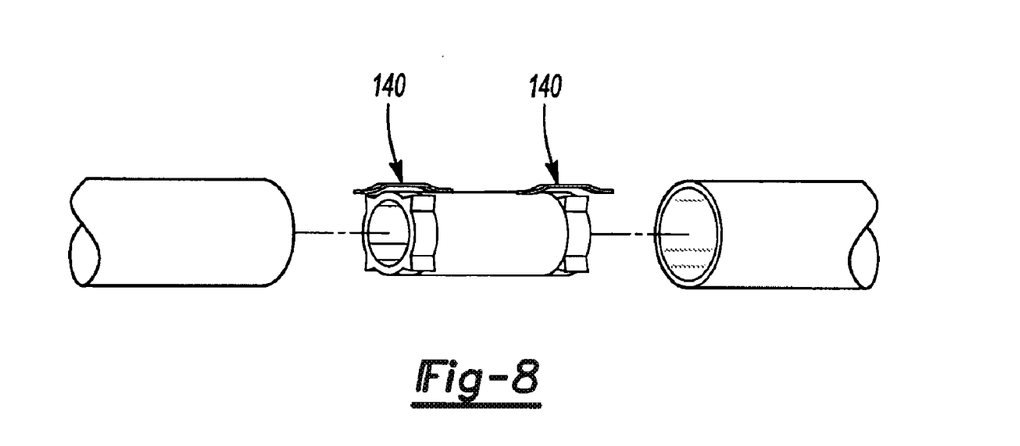
FIG. 8 is a perspective view of an exemplary joint being formed in accordance with an aspect of the present invention.
Figure 9:
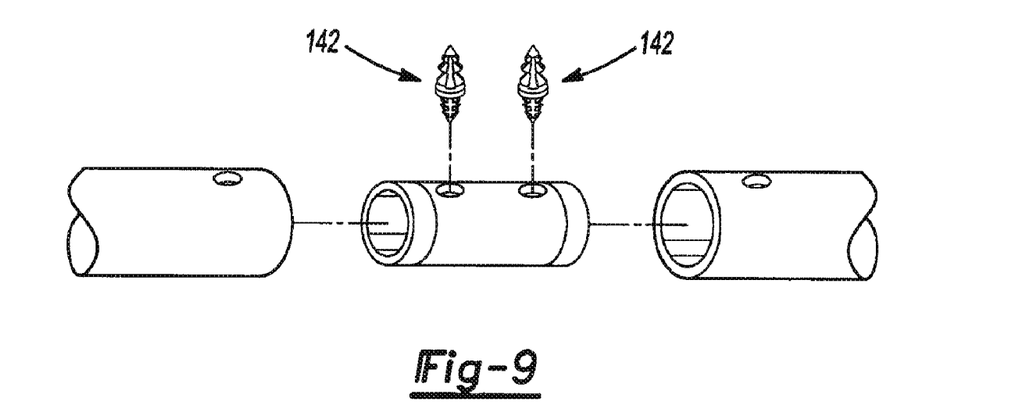
FIG. 9 is a perspective view of an exemplary joint being formed in accordance with an aspect of the present invention.
Figure 10:
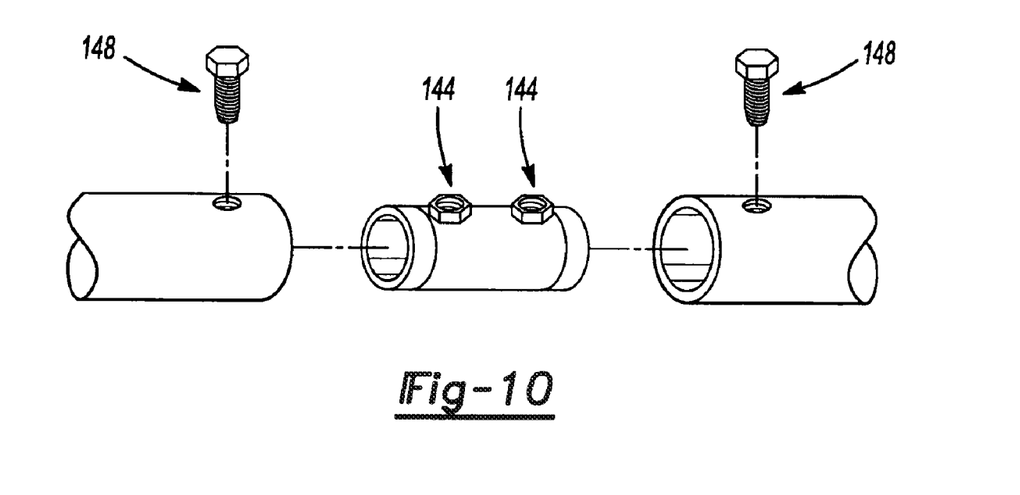
FIG. 10 is a perspective view of an exemplary joint being formed in accordance with an aspect of the present invention.

Mechanical attachments or fasteners can be employed to attach the connector to the members. Mechanical interlocks can be attached (e.g., insert molded) to the connector or integrally molded of the same material as the connector. FIG. 8 illustrates interlock fasteners 140 in the form of insert molded on metal clips. FIG. 9 illustrate interlock fasteners 142 in the form of push-pins shown as double-headed push-pins that are suitable for insertion into openings in the members and the connector. FIG. 10 illustrates insert molded nuts 144 in the connector 146 that are to be attached to bolts 148 extending through openings in the members.

Other options for attachments include, without limitation, weld tabs, pop rivets, entrapment devices, insert molded weld buttons, bang plugs. It is also contemplated that the connectors may include standoff, anti-rotation devices, poke yokes or the like.

Once the connector and the members are located as desired relative to each other, the structural adhesive material is preferably activated to foam, expand, wet, adhere, cross-link or thermoset or any combination thereof such that the adhesive material forms a relatively strong bond between the connector and the members connected thereby.

With reference to automotive vehicles and the use of joints of FIGS. 3-7 for automotive vehicles, the structural adhesive material 50 can be activated to expand (e.g., foam) and contact and whet the internal surfaces of the members 52 than define the openings extending along the length of those members 52 and further contact and whet the surface of the connectors 42. In turn, the structural adhesive material 50 crosslinks and/or thermosets to bond to the members 52 thereby structurally joining the members 52 to the connectors 24.

Advantageously, such adhesion and bonding can take place in an e-coat oven during processing and/or assembly of the automotive vehicle and particularly the BIW. As and added advantage, the connectors and adhesive material can form such joints after e-coat has been applied to the vehicle thereby allowing more robust coverage of the members and/or the connectors by the e-coat.

The connectors, or portions thereof, of the present invention have typically been shown as being located within cavities of tubular or otherwise shaped members and adhering to the interior surfaces of these members. However, it is contemplated that the connectors can be configured to adhere to outer surfaces of tubular or other members. For example, one or more connection potions of a connector can define a cavity suitable for receipt of an end of one or more tubular or other shaped members and activatable material disposed upon one or more internal surfaces defining the cavity can be activated to expand, foam, and/or adhere to one or more exterior surfaces of the members.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of forming a joint of an automotive vehicle, the method comprising:
   providing a first member of the automotive vehicle, the first member having a distal end;
   providing a second member of the automotive vehicle, the second member having a distal end; and
   providing a connector having a base portion, a first portion extending away from the base portion and a second portion extending away from the base portion, the connector also having activatable material including an epoxy resin and a core/shell polymer impact modifier disposed upon the first portion and the second portion and wherein the connector is tubular in shape and defines a plurality of intersecting ribs, one or more ribs having a curved shape to circumscribe the tubular shape of the connector;
   locating the first portion adjacent the distal end of the first member and the second portion adjacent the distal end of the second member; and
   activating the activatable material to form a structural adhesive foam having a tensile modulus greater than about 200 MPa and a post-activation ductility ratio greater than about 2.0 and adhering the structural adhesive foam to the first portion of the connector and the distal end of the first member and to the second portion of the connector and the distal end of the second member;
   wherein the foam provides sufficient strength to the joint whereby the first member is free of direct contact with the second member after activating the activatable material and the first and second members are connected to each another without any welds directly or indirectly connecting the members.

2. A method as in claim 1 wherein the first member and second member are part of a frame of the automotive vehicle.

3. A method as in claim 1 wherein at least one of the first member and the second member is a B-pillar.

4. A method as in claim 1 wherein the step of locating the first portion includes fastening the first portion to the distal end of the first member with a mechanical fastener.

5. A method as in claim 1 wherein the step of providing the first member includes hydroforming a first tubular structure defined by the first member.

6. A method as in claim 1 wherein the connector is formed of a plastic material.

7. A method as in claim 1 wherein the first portion of the connector extends away from the base portion in a first direction and the second portion extends away from the base portion in a second direction and the first direction is at an angle of less than 170° relative to the second direction.

8. A method as in claim 1 wherein the connector includes a third portion extending away from the base portion, the third portion also having activatable material disposed thereon wherein the step of activating the activatable material includes adhering the third portion of the connector to a third member of the automotive vehicle.

9. A method of forming a joint of an automotive vehicle, the method comprising:
   providing a first member of the automotive vehicle, the first member having a distal end, wherein the first member is provided by hydroforming a first tubular structure defined by the first member, the first tubular structure having a tunnel extending along its length and including at least one hydroformed contour;
   providing a second member of the automotive vehicle, the second member having a distal end wherein the second member is provided by hydroforming a second tubular structure defined by the second member, the first tubular structure having a tunnel extending along its length and including at least one hydroformed contour; and
   providing a connector having a base portion, a first portion extending away from the base portion and a second portion extending away from the base portion, the connector also having activatable material including an epoxy resin and a core/shell polymer impact modifier disposed upon the first portion and the second portion and wherein the connector is tubular in shape and defines a plurality of intersecting ribs, one or more ribs having a curved shape to circumscribe the tubular shape of the connector;

locating the first portion within the tunnel of the first tubular structure at the distal end of the first member and the second portion within the tunnel of the second tubular structure adjacent the distal end of the second member; and activating the activatable material to form a structural adhesive foam having a tensile modulus greater than about 200 MPa and a post-activation ductility ratio greater than about 2.0 and adhering the structural adhesive foam to the first portion of the connector and an interior surface of the first tubular structure at the distal end of the first member and adhering the structural adhesive foam to the second portion of the connector and an interior surface of the second tubular structure at the distal end of the second member, the interior surface of the first tubular structure at least partially defining the tunnel of the first tubular structure and the interior surface of the second tubular structure at least partially defining the tunnel of the second tubular structure;

wherein the foam provides sufficient strength to the joint whereby the first member is free of direct contact with the second member after activating the activatable material and the first and second members are connected to each another without any welds directly or indirectly connecting the members.

10. A method as in claim 9 wherein the first member and second member are part of a frame of the automotive vehicle.

11. A method as in claim 9 wherein at least one of the first member and the second member is a B-pillar.

12. A method as in claim 9 wherein the step of locating the first portion includes fastening the first portion to the distal end of the first member with a mechanical fastener.

13. A method as in claim 9 wherein the connector is formed of a plastic material.

14. A method as in claim 9 wherein the first portion of the connector extends away from the base portion in a first direction and the second portion extends away from the base portion in a second direction and the first direction is at an angle of less than 170° relative to the second direction.

15. A method as in claim 9 wherein the connector includes a third portion extending away from the base portion, the third portion also having activatable material disposed thereon wherein the step of activating the activatable material includes adhering the third portion of the connector to a third member of the automotive vehicle.

16. A method of forming a joint of an automotive vehicle, the method comprising:

providing a first member of the automotive vehicle, the first member having a distal end, wherein the first member is provided by hydroforming a first tubular structure defined by the first member, the first tubular structure having a tunnel extending along its length and including at least one hydroformed contour;

providing a second member of the automotive vehicle, the second member having a distal end wherein the second member is provided by hydroforming a second tubular structure defined by the second member, the first tubular structure having a tunnel extending along its length and including at least one hydroformed contour; and providing a connector having a base portion, a first portion extending away from the base portion and a second portion extending away from the base portion, the connector also having activatable material including an epoxy resin and a core/shell polymer impact modifier disposed upon the first portion and the second portion and wherein the connector is tubular in shape and defines a plurality of intersecting ribs, one or more ribs having a curved shape to circumscribe the tubular shape of the connector;

locating the first portion within the tunnel of the first tubular structure at the distal end of the first member and the second portion within the tunnel of the second tubular structure adjacent the distal end of the second member; and activating the activatable material to form a structural adhesive foam having a tensile modulus greater than about 200 MPa and a post-activation ductility ratio greater than about 2.0 and adhering the structural adhesive foam to the first portion of the connector and an interior surface of the first tubular structure at the distal end of the first member and adhering the structural adhesive foam to the second portion of the connector and an interior surface of the second tubular structure at the distal end of the second member, the interior surface of the first tubular structure at least partially defining the tunnel of the first tubular structure and the interior surface of the second tubular structure at least partially defining the tunnel of the second tubular structure;

wherein:
i. the foam provides sufficient strength to the joint whereby the first member is free of direct contact with the second member after activating the activatable material and the first and second members are connected to each another without any welds directly or indirectly connecting the members;
ii. the first member and second member are part of a frame of the automotive vehicle;
iii. at least one of the first member and the second member is a B-pillar;
iv. the step of locating the first portion includes fastening the first portion to the distal end of the first member with a mechanical fastener;
v. the connector is formed of a plastic material;
vi. the connector defines a plurality of intersecting ribs;
vii. the first portion of the connector extends away from the base portion in a first direction and the second portion extends away from the base portion in a second direction and the first direction is at an angle of less than 170° relative to the second direction; and
viii. the connector includes a third portion extending away from the base portion, the third portion also having activatable material disposed thereon wherein the step of activating the activatable material includes adhering the third portion of the connector to a third member of the automotive vehicle.

17. A method as in claim 16 wherein the connector includes a first plurality of ribs extending transversely and intersecting a second plurality of ribs and wherein the activatable material is thermosettable and is activated to expand and thermoset in an e-coat or paint oven.

18. A method as in claim 16 wherein each member includes a plurality of parallel ribs extending lengthwise along the member and a plurality of ribs adjacent the circumference of each member and arranged perpendicular to the plurality of parallel ribs.

* * * * *